United States Patent
Vollrath et al.

[15] 3,673,215
[45] June 27, 1972

[54] SUBSTITUTED CHRYSANTHEMUMATES

[72] Inventors: Robert Vollrath, Bad Duerkheim; Axel Nuerrenbach, Gruenstadt; Heinrich Adolphi, Limburgerhof, all of Germany

[73] Assignee: Badische Anilin -& Soda-Fabrik Aktiengesellschaft, Ludwigshafen/Rhine, Land Rhineland and- Pfalz, Germany

[22] Filed: Aug. 14, 1969

[21] Appl. No.: 850,242

[30] Foreign Application Priority Data

Aug. 29, 1968 Germany ..................... P 17 93 312.9

[52] U.S. Cl. ............. 260/332.2 R, 260/332.3 R, 260/340.5, 260/347.4, 260/347.8, 260/468 P, 260/618, 424/275, 424/282, 424/285, 424/306

[51] Int. Cl. ................ C07d 63/12, C07c 69/74, A61k 27/00

[58] Field of Search ................. 260/332.2 R, 340.5, 347.4, 260/468 P

[56] References Cited

UNITED STATES PATENTS 3,478,057  11/1969  Baklien et al. ........................ 260/329
3,047,611  7/1962  Moore et al. ......................... 260/468

*Primary Examiner*—Henry R. Jiles
*Assistant Examiner*—Cecilia M. Shurto
*Attorney*—Johnston, Root, O'Keeffe, Keil, Thompson & Shurtleff

[57] ABSTRACT

New and valuable chrysanthemumates, particularly esters having triunsaturated alcohols, and a process for controlling pests with these esters.

10 Claims, No Drawings

SUBSTITUTED CHRYSANTHEMUMATES

The invention relates to new and valuable chrysanthemumates, especially esters having triunsaturated alcohols, and to pesticides containing them.

It is known to use various substituted benzyl esters of chrysanthemumic acid as insecticides (U.S. Pat. Nos. 2,857,309; 3,358,011); further, some chrysanthemumates of alkylynols are known which have herbicidal properties (U.S. Pat. No. 3,285,950). However, their action is not completely satisfactory.

We have now found that chrysanthemumates having the formula

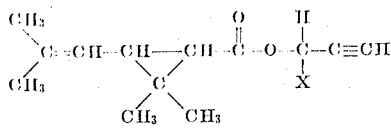

where X denotes a phenyl group having the formula

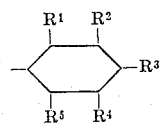

$R^1$, $R^2$, $R^4$ and $R^5$ each denoting hydrogen, halogen (chlorine, bromine, iodine, fluorine), an alkyl radical having one to three carbon atoms, trihalomethyl (fluorine, chlorine, bromine, iodine), the radicals $R^1$ to $R^4$ being identical or different, $R^3$ denoting hydrogen, halogen (chlorine, bromine, iodine, fluorine), trihalomethyl (chlorine, bromine, iodine, fluorine), an alkyl radical having one to three carbon atoms, an alkenyl radical having two to three carbon atoms, $R^2$ and $R^3$ together denoting the radical —CH = CH—CH = CH—, $R^3$ and $R^4$ together denoting the methylenedioxy radical, or X denotes a heteroaromatic radical having the formula

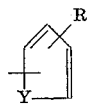

where Y denotes oxygen or sulfur and R denotes hydrogen, an alkyl radical having one to three carbon atoms or a benzyl radical, are eminently suitable for controlling pests and are distinguished by a good insecticidal action on houseflies and cockroaches. Their action is superior to that of the above-mentioned prior art active ingredients.

The compounds according to the invention may be easily produced, e.g. by reaction of a correspondingly substituted aldehyde with acetylene to give prop-2-ynol in accordance with the formula

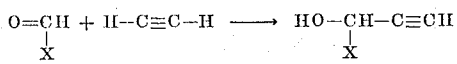

and esterification of the prop-2-ynol with chrysanthemumic acid derivatives in accordance with the formula

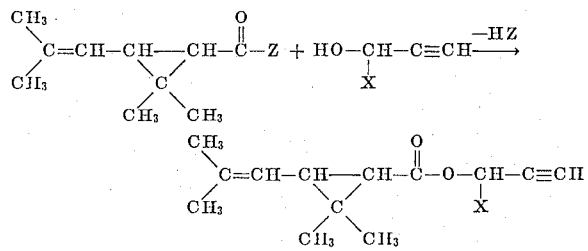

X having the meanings given above and Z denoting, for example, halogen (chlorine).

The prop-2-ynols are preferably prepared from the aldehydes with sodium acetylide in tetrahydrofuran as solvent at temperatures of from 0° to 60° C, preferably room temperature.

The following solvents may also be used instead of tetrahydrofuran: benzene, toluene, ether, dioxane, at from 0° to 60° C, and liquid ammonia at −30° C. Reaction times are two to 12 hours depending on the type and number of substituents, the reaction temperature and the type of solvent.

The best results are obtained when the compounds according to the invention are produced by reaction of the prop-2-ynols with chrysanthemumic acid chloride in an inert organic solvent, e. g. benzene, toluene, ligroin, ether, tetrahydrofuran or chloroform in the presence of an inorganic or organic base, e. g. sodium hydroxide, triethylamine or pyridine at temperatures of from 0° to 60° C. Reaction times are one to eight hours, depending on the type of substituents and the reaction temperature.

The production of the compounds according to the invention is illustrated by the following:

a. Preparation of 1-(m-toluyl)-prop-2-ynol 12 parts by weight of m-toluylaldehyde dissolved in 15 parts of tetrahydrofuran is dripped, while stirring and at 20° C, into a suspension of 24 parts of sodium acetylide in 150 parts of tetrahydrofuran; the whole is stirred for six hours at room temperature. The reaction mixture is decomposed with 100 parts of saturated ammonium chloride solution while cooling with ice; the organic phase is separated, washed with saturated sodium chloride solution and dried over sodium sulfate. After the tetrahydrofuran has been distilled off, the crude product is purified by fractional distillation.

| Compound | b.p. (°C/mm) | |
|---|---|---|
| 1-phenylprop-2-ynol | 60 | / 0.1 |
| 1-(p-chlorophenyl)-prop-2-ynol | 80 to 90 | / 0.2 |
| 1-(m-chlorophenyl)-prop-2-ynol | 85 | / 0.3 |
| 1-(2',4'-dichlorophenyl)-prop-2-ynol | (m.p. 53 to 54) | |
| 1-(3',4'-dichlorophenyl)-prop-2-ynol | 100 | / 0.05 |
| 1-(m-fluorophenyl)-prop-2-ynol | 59 to 65 | / 0.1 |
| 1-(m-bromophenyl)-prop-2-ynol | 114 | / 1.5 |
| 1-(m-toluyl)-prop-2-ynol | 71 to 73 | / 0.1 |
| 1-(p-toluyl)-prop-2-ynol | 72 to 75 | / 0.1 |
| 1-(m-trifluoromethylphenyl)-prop-2-ynol | 108 to 115 | / 14 |
| 1-(2',4'-dimethylphenyl)-prop-2-ynol | 93 to 97 | / 0.25 |
| 1-(3',4'-dimethylphenyl)-prop-2-ynol | 85 to 88 | / 0.1 |
| 1-(p-isopropylphenyl)-prop-2-ynol | 92 to 93 | / 0.2 |
| 1-(p-allylphenyl)-prop-2-ynol | 86 to 91 | / 0.1 |
| 1-(β-naphthyl)-prop-2-ynol | (m.p. 60 to 64) | |
| 1-(2'-furyl)-prop-2-ynol | 54 to 59 | / 0.15 |
| 1-(2'-methyl-4'-furyl)-prop-2-ynol | 115 to 120 | / 20 |
| 1-(2'-benzyl-4'-furyl)-prop-2-ynol | 128 to 140 | / 0.1 |
| 1-(2'-methyl-5'-furyl)-prop-2-ynol | 90 to 99 | / 14 |
| 1-(2'-thienyl)-prop-2-ynol | 74 | / 0.2 |
| 1-(3',4'-methylendioxyphenyl)-prop-2-ynol | 113 to 116 | / 0.15 |
| 1-(2'-bromo-3',4'-methylendioxyphenyl)-prop-2-ynol | (m.p. 101 to 103) | | b. Preparation of chrysanthemumate 18.8 parts by weight of chrysanthemumic acid chloride is dripped, while stirring and cooling with ice, into 14.6 parts of 1-(m-toluyl)-prop-2-ynol and 16 parts of dry pyridine or triethylamine in dry benzene, toluene or ether. The reaction mixture is subsequently stirred for several hours at room temperature or for one hour at 40' to 60° C. After water has been added, the organic phase is separated, washed with dilute sulfuric acid, sodium bicarbonate and water, dried and concentrated. The crude chrysanthemumate is purified by vacuum distillation or by chromatography with aluminum oxide.

The pesticides according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent.

Dusts may be prepared by mixing or grinding the active ingredients with a solid carrier.

The following comparative experiments demonstrate the superior biological action of the compositions according to this invention over known active ingredients.

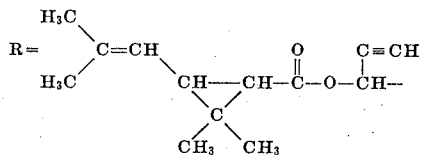

| Active ingredient number | | B.p. (° C./mm.) | Analysis |
| --- | --- | --- | --- |
| 1 | R—⌬ | 133 to 138/0.1 | C, 80.5 (80.9); H, 8.0 (7.8) |
| 2 | R—⌬—Cl | | C, 71.6 (72); H, 6.7 (6.6); Cl, 11.5 (11.2). |
| 3 | R—⌬ (Cl) | 111 to 118/0.01 | C, 71.8 (72); H, 6.8 (6.6); Cl, 11.4 (11.2). |
| 4 | R—⌬(Cl)—Cl | | C, 64.7 (65.1); H, 5.9 (5.7); Cl, 20.5 (21.0). |
| 5 | R—⌬(Cl)—Cl | | C, 65.4 (65.1); H, 6.1 (5.7); Cl, 20.7 (21.0). |
| 6 | R—⌬ (F) | 111 to 112/0.05 | C, 75.8 (76.0); H, 7.2 (7.0). |
| 7 | R—⌬ (Br) | | C, 63.0 (63.2); H, 6.1 (5.8); Br, 21.8 (22.1). |
| 8 | R—⌬ ($CF_3$) | 120 to 130/0.2 | C, 69.0 (68.6); H, 6.2 (6.0). |
| 9 | R—⌬—$CH_3$ | | C, 81.1 (81.1); H, 8.4 (8.1). |
| 10 | R—⌬ ($CH_3$) | | C, 81.1 (81.1); H, 8.5 (8.1). |
| 11 | R—⌬($CH_3$)—$CH_3$ | | C, 81.2 (81.4); H, 8.7 (8.3). |
| 12 | R—⌬($CH_3$)—$CH_3$ | | C, 81.5 (81.2); H, 8.7 (8.3). |
| 13 | R—⌬—CH($CH_3$)$_2$ | | C, 81.2 (81.5); H, 8.8 (8.7). |
| 14 | R—⌬—$CH_2$—CH=$CH_2$ | | C, 81.8 (82.0); H, 8.4 (8.1). |
| 15 | R—naphthyl | | C, 82.9 (83.2); H, 7.5 (7.2). |

Table — Continued

| Active ingredient number | | B.p. (° C./mm.) | Analysis |
|---|---|---|---|
| 16 | R—[furan] | | C, 74.8 (75.0); H, 7.6 (7.4). |
| 17 | R—[furan]—CH₃ | | C, 75.4 (75.5); H, 8.0 (7.8). |
| 18 | R—[furan]—CH₂—[phenyl] | | C, 79.5 (79.6); H, 7.5 (7.2). |
| 19 | R—[furan]—CH₃ | | C, 75.3 (75.5); H, 8.0 (7.8). |
| 20 | R—[thiophene] | 112 to 114/0.05 | C, 70.8 (70.9); H, 7.2 (7.0); S, 10.7 (11.1). |
| 21 | R—[benzodioxole] | | C, 74.0 (73.6); H, 7.0 (6.8). |
| 22 | R—[benzodioxole]—Br | | C, 59.6 (59.3); H, 5.5 (5.2); Br, 19.0 (19.8). |

Prior art active ingredients used for comparison purposes are as follows:

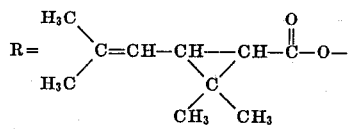

$$R = \begin{array}{c} H_3C \\ H_3C \end{array} C=CH-CH-\underset{\underset{CH_3}{\overset{}{\underset{|}{C}}}{\overset{|}{\underset{CH_3}{}}}}{}-CH-\overset{O}{\overset{\|}{C}}-O-$$

| Active ingredient | | |
|---|---|---|
| A | R—C(C≡CH)(CH₃)—CH₂—CH₂—CH=C(CH₃)CH₃ | U.S. Patent No. 3,285,950; col. 1, l. 27. |
| B | R—C(C≡CH)(CH₃)—CH₂—CH=C(CH₃)—CH₂—CH₂—CH=C(CH₃)CH₃ | U.S. Patent No. 3,285,950; col. 1, l. 28. |
| C | R—CH(CH₃)—CH₂—CH=C(CH₃)CH₃ | U.S. Patent No. 3,285,950; col. 1, l. 30. |
| D | R—C(C≡CH)(CH₃)—CH₃ | U.S. Patent No. 3,285,950; col. 1, l. 33. |
| E | R—C(CH=CH₂)(CH₃)—CH₃ | U.S. Patent No. 3,285,950; col. 1, l. 34. |
| F | R—CH₂—[2,4-dimethylphenyl with CH₃ groups] | U.S. Patent No. 2,857,309; claim 2. |
| G | R—CH₂—[phenyl]—CH₂—CH=CH₂ | U.S. Patent No. 3,358,011; Example 1. |
| H | R—CH₂—[2,4-dimethylphenyl]—CH₂—CH=CH₂ | U.S. Patent No. 3,358,011; Example 15. |

EXAMPLE 1

1 mm³ of acetonic solution of the active ingredients was pipetted onto the abdomen of houseflies (Musca domestica). After four hours mortality counts were made for the different concentrations and the $LD_{50}$ values calculated from them.

| Active ingredient | $LD_{50}$ in γ/fly |
| --- | --- |
| 1 | 1.25 |
| 2 | 0.18 |
| 3 | 0.11 |
| 4 | 0.36 |
| 5 | 0.083 |
| 6 | 0.25 |
| 7 | 0.13 |
| 8 | 0.056 |
| 9 | 0.21 |
| 10 | 0.15 |
| 11 | 0.22 |
| 12 | 0.24 |
| 13 | 0.3 |
| 15 | 0.15 |
| 17 | 0.37 |
| 18 | 0.1 |
|  | 0.4 |
| 20 | 0.4 |
| 21 | 0.36 |
| A | 2 |
| B | 2 |
| C | 2 |
| D | 2 |
| E | 2 |

EXAMPLE 2

Sustained Exposure of Oriental Cockroach (*Blatta orientalis*)

Acetonic solutions of the active ingredients were evenly distributed in 1 liter beakers. After the solvent had evaporated, adult cockroaches were placed in the beakers and the action was ascertained after 48 hours. A concentration killing 80 – 100 percent of the animals was designated effective.

| Active ingredient | amount of active ingredient in mg/beaker | |
| --- | --- | --- |
| 2 | 2.5 | effective |
| 4 | 2.5 | effective |
| 5 | 2.5 | effective |
| 9 | 2.5 | effective |
| 10 | 1 | effective |
| 11 | 0.5 | effective |
| 12 | 2.5 | effective |
| 13 | 2.5 | effective |
| 14 | 2.5 | effective |
| 15 | 2.5 | effective |
| 16 | 2.5 | effective |
| 17 | 2.5 | effective |
| 18 | 2.5 | effective |
| 21 | 1 | effective |
| A | 10 | ineffective |
| B | 10 | ineffective |
| C | 10 | ineffective |
| D | 10 | ineffective |
| E | 10 | ineffective |
| F | 5 | effective |
| G | 5 | effective |

EXAMPLE 3

Action on Mosquito Larvae (*Aedes aegypti*)

Larvae of the mosquito (*Aedes aegypti*) in the fourth larval stage were introduced into 200 ml vessels holding water. An aqueous formulation of the active ingredients was then added and the action was ascertained after 24 hours. Mortalities of more than 80 percent were designated effective.

| Active ingredient | amount (parts by weight) of the active ingredient in the water | |
| --- | --- | --- |
| 5 | 0.01 ppm | effective |
| F | 0.1 ppm | effective |
| G | 0.04 ppm | effective |
| H | 0.02 ppm | effective |
| A to E | 5 ppm | ineffective |

EXAMPLE 4

Action on Caterpillars of the Cabbage Moth (*Plutella maculipennis*)

Cabbage leaves were dipped into an aqueous emulsion of the active ingredients. After the coatings had dried, caterpillars of the cabbage moth were placed on the leaves. After 48 hours the kill rate was determined and the damage caused by the caterpillars assessed.

| Active ingredient | content (% by weight) of the active ingredient in the emulsion | |
| --- | --- | --- |
| 2 | 0.01 | effective |
| 5 | 0.02 | effective |
| 21 | 0.02 | effective |
| 22 | 0.05 | effective |
| A, C, D, E | 0.1 | ineffective |
| B | 0.1 | effective |
| F | 0.1 | effective |

These experiments clearly reveal the superiority of the new compounds according to the invention over prior art active ingredients.

We claim:

1. A chrysanthemumate having the formula

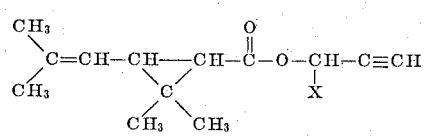

where X denotes a phenyl group having the formula

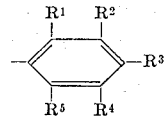

$R^1$, $R^2$, $R^4$ and $R^5$ each denoting hydrogen, halogen, an alkyl radical having one to three carbon atoms, trihalomethyl, the radicals $R^1$ to $R^4$ being identical or different, $R^3$ denoting hydrogen, halogen, trihalomethyl, an alkyl radical having one to three carbon atoms, an alkenyl radical having two to three carbon atoms, $R^2$ and $R^3$ together denoting the radical —CH = CH—CH = CH—, $R^3$ and $R^4$ together denoting the methylenedioxy radical, said phenyl group having at most two of said radicals and the remaining of $R^1$ through $R^5$ being hydrogen, or X denotes a heteroaromatic radical having the formula

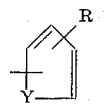

where Y denotes oxygen or sulfur and R denotes hydrogen, an alkyl radical having one to three carbon atoms or a benzyl radical.

2. A chrysanthemumate as claimed in claim 1 wherein X denotes chlorophenyl.

3. A chrysanthemumate as claimed in claim 1 wherein X denotes dichlorophenyl.

4. A chrysanthemumate as claimed in claim 1 wherein X denotes bromophenyl.

5. A chrysanthemumate as claimed in claim 1 wherein X denotes trifluoromethylphenyl.

6. A chrysanthemumate as claimed in claim 1 wherein X denotes 3',4'-methylenedioxyphenyl.

7. A chrysanthemumate as claimed in claim 1 wherein X denotes tolyl.

8. A chrysanthemumate as claimed in claim 1 wherein X denotes furyl.

9. A chrysanthemumate as claimed in claim 1 wherein X denotes thienyl.

10. A chrysanthemumate as claimed in claim 1 wherein X denotes naphthyl.

* * * * *